United States Patent [19]
Park et al.

[11] Patent Number: 6,148,623
[45] Date of Patent: Nov. 21, 2000

[54] SYSTEM AND METHOD FOR MEASURING AMOUNT OF ELECTRIC POWER CONSUMPTION IN A REFRIGERATOR

[75] Inventors: Yong-Jong Park, Kyonggi-do; Hak-Kyun Bae; Kyu-Ho Shin, both of Suwon, all of Rep. of Korea

[73] Assignee: SamSung Electronics Co., Ltd., Suwon, Rep. of Korea

[21] Appl. No.: 09/243,685

[22] Filed: Feb. 3, 1999

[30] Foreign Application Priority Data

Feb. 3, 1998 [KR] Rep. of Korea .................. 98-2887

[51] Int. Cl.$^7$ ............................................... G01K 13/00
[52] U.S. Cl. .............................................................. 62/129
[58] Field of Search ........................ 62/125, 126, 127, 62/129; 165/11.1

[56] References Cited

U.S. PATENT DOCUMENTS

| | | |
|---|---|---|
| 4,393,662 | 7/1983 | Dirth . |
| 4,510,576 | 4/1985 | MacArthur et al. ............... 364/551 |
| 4,567,474 | 1/1986 | Wolin . |
| 4,573,325 | 3/1986 | Chiu et al. . |
| 4,630,211 | 12/1986 | Pettis . |
| 4,768,346 | 9/1988 | Mathur ................................. 62/127 |
| 4,811,567 | 3/1989 | Babanowski et al. . |
| 4,858,141 | 8/1989 | Hart et al. . |
| 5,046,324 | 9/1991 | Otoh et al. . |
| 5,083,438 | 1/1992 | McMullin ............................ 62/129 |
| 5,168,170 | 12/1992 | Hartig . |
| 5,203,179 | 4/1993 | Powell . |
| 5,284,026 | 2/1994 | Powell . |
| 5,315,236 | 5/1994 | Lee . |
| 5,335,507 | 8/1994 | Powell . |
| 5,412,303 | 5/1995 | Wernicki . |
| 5,438,844 | 8/1995 | Hoglun et al. ........................ 62/155 |
| 5,675,503 | 10/1997 | Moe et al. . |
| 5,778,686 | 7/1998 | Choi . |
| 5,811,966 | 9/1998 | Lee . |

*Primary Examiner*—William Doerrler
*Assistant Examiner*—Marc Norman
*Attorney, Agent, or Firm*—Robert E. Bushnell, Esq.

[57] ABSTRACT

A method for measuring the amount of electric power consumption of a refrigerator comprises the steps of: measuring the amount of electric power consumption and a time of a defrosting cycle in a refrigerator during operation of a defrosting heater after starting a measurement of the amount of electric power consumption and during two cycles of operating a compressor after operating the defrosting heater; measuring the average of electric power consumption per cycle and the average of operating time per cycle in the refrigerator during performance of refrigerating cycles after the defrosting cycle; and calculating the total amount of electric power consumption of the refrigerator using the amount of electric power consumption during the performance of the defrosting cycle, the average amount of electric power consumption of the refrigerator during the performance of the refrigerating cycle, the time for performing the defrosting cycle, and the average time for performing the refrigerating cycle.

17 Claims, 6 Drawing Sheets

SYSTEM AND METHOD FOR MEASURING AMOUNT OF ELECTRIC POWER CONSUMPTION IN A REFRIGERATOR

CLAIM OF PRIORITY

This application makes reference to, incorporates the same herein, and claims all benefits accruing under 35 U.S.C. §119 from an application for *A SYSTEM AND A METHOD FOR MEASURING AN AMOUNT OF ELECTRIC POWER CONSUMPTION IN A REFRIGERATOR* earlier filed in the Korean Industrial Property Office on the Feb. 3, 1998 and there duly assigned Serial No. 2887/1998.

BACKGROUND OF THE INVENTION

1. Technical Field

The present invention relates to a system and method for measuring an amount of electric power consumption of a refrigerator and, more particularly to a system and method capable of decreasing the time required for measuring the amount of electric power consumption so as to reduce the power consumption according to the measurement of the amount of electric power consumption. The system and method accomplish an accurate, broad and excellent analysis of data relating to the amount of electric power consumption.

2. Related Art

As is well known, an electric refrigerator and an electric freezer must meet regulations as to the amount of electric power consumption of the electric refrigerator and the electric freezer in accordance with industrial standards which are provided by authorities of the government of each country. The electric refrigerator and the electric freezer are subjected to a test for measuring the amount of electric power consumption, as provided by the regulation of industrial standards so as to satisfy the regulations relating to the amount of electric power consumption. In the test for measuring the amount of electric power consumption, the amount of the electric power consumption in the electric refrigerator and the electric freezer is measured under test conditions provided by the regulations relating to industrial standards and calculated on the basis of a monthly average.

With respect to the electric refrigerator, the amount of electric power consumption is measured under the conditions that an average temperature is 3±0.5° C. in a refrigerating room with an atmospheric temperature of 30±1° C. being a reference temperature. With respect to the electric freezer, an average temperature in a freezing room is based on the type of freezing room, as shown in Table 1.

TABLE 1

| Temperature in the freezing room (° C.) | | | |
|---|---|---|---|
| Type of freezing room | one asters | two asters | three and four asters |
| average temperature | −6 ± 0.5 | −12 ± 0.5 | −18 ± 0.5 |

According to the test for measuring the amount of electric power consumption, the amount of electric power consumption in the electric refrigerator is measured by performing processes as described below for 24 hours, 48 hours, or 72 hours after approaching the safety state under atmospheric temperature of 30±1° C. The amount of electric power consumption is measured in kilowatt-hours (kWh).

1. In principle, the test is carried out for 24 hours. If the defrosting operation, which is performed as a requirement at the start of the test, and an automatic defrosting operation, are completed twice or more than in the refrigerator, the test is performed for 24 hours. If the automatic defrosting operation is not present or carried out in the refrigerator, however, the test is continued for 48 hours. If the automatic defrosting operation is performed in the refrigerator in 24 hours, the test is completed once it has proceeded for 48 hours. Furthermore, if the automatic defrosting operation is not carried out in the refrigerator within 48 hours, the test is finished once the test has proceeded for 72 hours. The automatic defrosting operation is completed once the temperature in the freezing room reaches the temperature indicated in Table 1.

2. The defrosting operation is as follows:

A. If a manual defrosting operation must be started, the defrosting operation is not carried out.

B. If the defrosting operation must be carried out in any other manner, the defrosting operation is required to be carried out at the starting time of the test.

C. If it is impossible to carry out the defrosting operation, the time that the defrosting operation is automatically carried out is regarded as the starting time of the test.

3. The test for measuring the amount of electric power consumption is carried out by operating an apparatus, such as a heater, to prevent dew from attaching to the walls of the refrigerating room. An additional device, having various functions, which has no effect on refrigeration, is also operated.

The amount of electric power consumption in the refrigerator, measured under the that condition described above, is calculated for a month using the following formulae:

$$Wy = Wd \times 365$$

$$Wmy = Wy \div 12$$

where Wd is the amount of electric power consumption for a day (KWh/day), Wy is the amount of electric power consumption for a year (KWh/year), and Wmy is the average amount of electric power consumption for a month (KWh/month).

The test for measuring the amount of electric power consumption is carried out in accordance with the Korean Standards, for example, KSC9305.

A system for measuring the amount of electric power consumption under the condition described above is disclosed below. Such a system is, as also explained below, burdened by several disadvantages. First, excessive time is required for measuring the amount of electric power consumption. Second, an excess amount of electric power must be spent in order to measure the consumption itself. Third, the method does not produce accurate and excellent analysis of the data collected by the method.

The following patents are considered to be representative of the prior art, and are burdened by the disadvantages set forth herein: U.S. Pat. No. 5,811,966 to Lee, entitled *Meter For Measuring And Displaying The Power Consumption Of AN Electrical Appliance And The Time Period Of Such Power Consumption*, U.S. Pat. No. 5,778,686 to Choi, entitled *Method Of Controlling An Operation Of An Automatic Ice Maker In A Refrigerator*, U.S. Pat. No. 5,675,503 to Moe el al., entitled *Adaptive Load Cycler For Controlled Reduction Of Energy Use*, U.S. Pat. No. 5,412,303 to Wernicki, entitled *Method And Apparatus Providing Minimal Power Consumption, Indication Of Savings And Fault Detection*, U.S. Pat. No. 5,335,507 to Powell, entitled *Con-* trol System For AN Air Conditioning/Refrigeration System, U.S. Pat. No. 5,315,236 to Lee, entitled Power Consumption Meter For Displaying Electric Power Consumed By Appliance And The Time Period Of Consumption, U.S. Pat. No. 5,284,026 to Powell, entitled Control System For AN Air Conditioning/Refrigeration System, U.S. Pat. No. 5,203,179 to Powell, entitled Control System For AN Air Conditioning/ Refrigeration System, U.S. Pat. No. 5,168,170 to Hartig, entitled Subscriber Electric Power Load Control System, U.S. Pat. No. 5,046,324 to Otoh et al., entitled Defrosting Controller For Refrigeration Systems, U.S. Pat. No. 4,858, 141 to Hart et al., entitled Non-Intrusive Appliance Monitor Apparatus, U.S. Pat. No. 4,811,567 to Bakanowski et al., entitled Method For Testing The Operability Of A Refrigerant System, U.S. Pat. No. 4,630,211 to Pettis, entitled Watt-Hour Meter Display For Informing Consumer Of Energy Consumption, U.S. Pat. No. 4,573,325 to Chiu et al., entitled Self-Diagnostic System For An Appliance Incorporating AN Automatic Icemaker, U.S. Pat. No. 4,567,474 to Wolin, entitled Freezer Accidental Defrost Warning Device, and U.S. Pat. No. 4,393,662 to Dirth, entitled Control System For Refrigeration Or Air Conditioning Installation.

SUMMARY OF THE INVENTION

The present invention has been developed to overcome the above described problems. It is an object of the present invention to provide a method and a system for measuring an amount of electric power consumption, in which it is possible to reduce the time for measuring the amount of electric power consumption in the refrigerator, and to reduce the consumption of electric power according to the measured amount of electric power consumption, and in which an accurate, broad and excellent analysis of data associated with the test for measuring the amount of electric power consumption is obtained.

To accomplish the above object of the present invention, according to an aspect of the present invention, there is provided a method for measuring an amount of electric power consumption of a refrigerator, comprising the steps of:

measuring an amount of electric power consumption and a time of a defrosting cycle in a refrigerator during operation of a defrosting heater after starting measurement of the amount of electric power consumption, and during two cycles of operating a compressor after operating the defrosting heater;

measuring an average of the electric power consumption per cycle and an average of the operating time per cycle in the refrigerator during operation of refrigerating cycles after the defrosting cycle; and calculating the total amount of electric power consumption of the refrigerator in accordance with the following formula:

$$Wh = Whdef \times k + Wh \ln \times \left(\frac{24 \times n - DT \times k}{CT}\right)$$

where n=1, 2, or 3, k=1 or 2, Wh represents the total amount of electric power consumption of the refrigerator, Whdef is the amount of electric power consumption during the defrosting cycle, DT represents a defrosting cycle time, CT is the average operation time per cycle, and Whln is the average amount of electric power consumption per refrigerating cycle.

The time of the defrosting cycle is a sum of a time for applying an electric current to the defrosting heater, a first off time, a first operation time of the compressor, a second off time, and a second operation time of the compressor.

When the operation time for a measurement test is shown as follows:

$TCT=DT\times22+CT\times$(the number of operation cycles for defrosting period)

if the TCT<1440, the integral number n is 1,
if 1440≦the TCT≦2880, the integral number n is 2, and
if 2880≦the TCT, the integral number n is 3.

When the operation time for a measurement test is shown as follows:

$TCT=DT\times2+CT\times$(the number of operation cycles for defrosting period)

if the TCT<1440, the integral number k is 1,
if 1440≦the TCT≦2880, the integral number k is 2, and
if 2880≦the TCT≦4320 and the number of the defrosting cycles is 1, the integral number k is 1, if the number of the defrosting cycle is 2, the integral number k is 2.

According to another aspect of the present invention, there is provided a system for measuring the amount of electric power consumption in a refrigerator according to a test condition and method specified by any industrial standards, the system comprising:

a device for measuring an amount of electric power consumption for a defrosting cycle, a time for performing the defrosting cycle, an average amount of electric power consumption for a refrigerating cycle, and an average time for performing the refrigerating cycle;

a computer for processing respective data which are measured by the measuring device, for outputting a report and evaluation of a measuring test, and for transmitting the data on-line; and an interfacing device for transmitting the data measured by the measuring device in the form of electric signals to the computer, and for receiving electric signals from the computer to control the measuring device.

Preferably, the interfacing device includes a GP-IB card.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Hereinafter, a method for measuring an amount of electric power consumption according to a preferred embodiment of the present invention will be described in detail with reference to the accompanying drawings.

Figure 1:
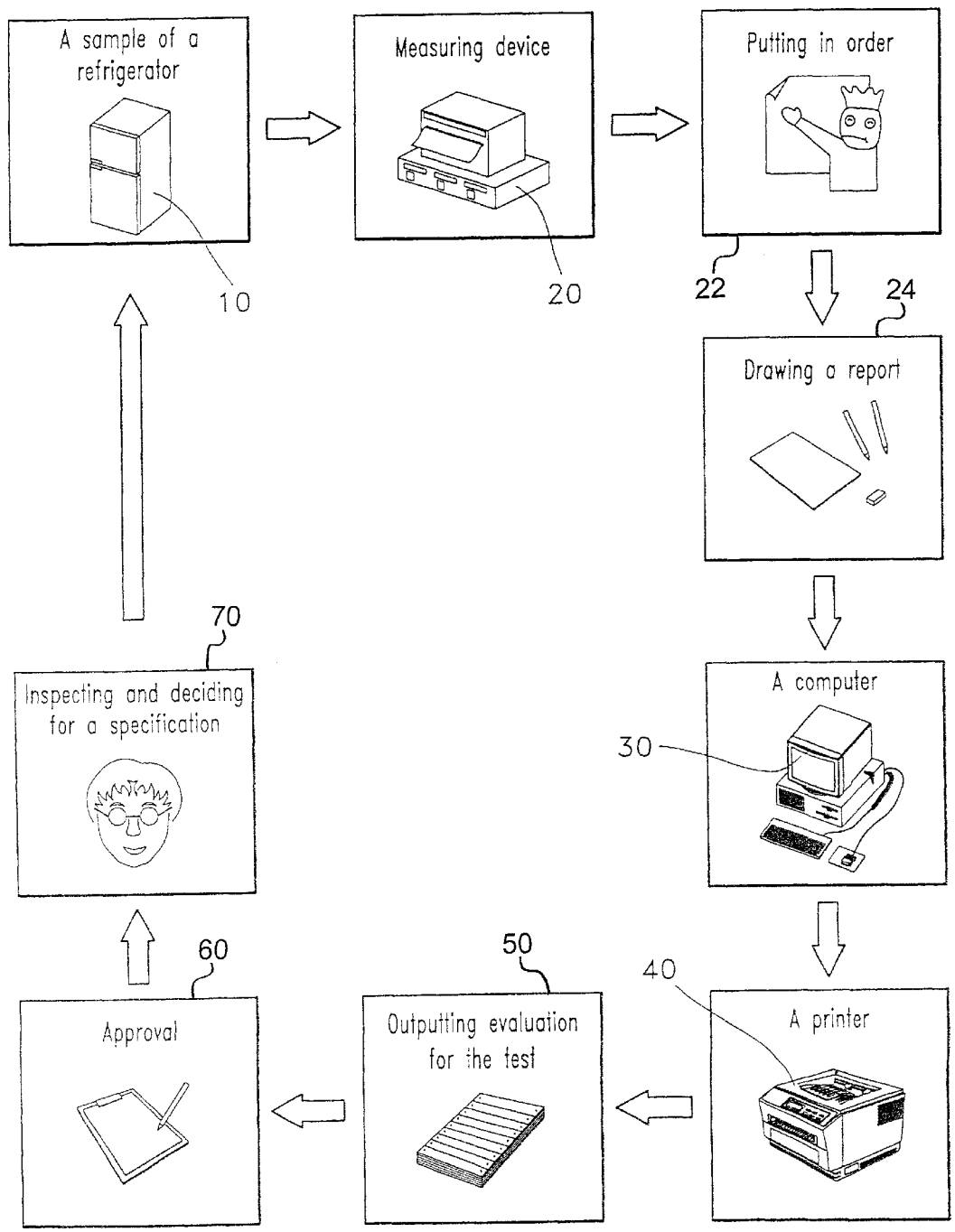
FIG. 1 is a block diagram schematically showing a system for measuring an amount of electric power consumption in a refrigerator.

FIG. 1 illustrates a system and process for measuring the amount of electric power consumption in a refrigerator.

Figure 2A:
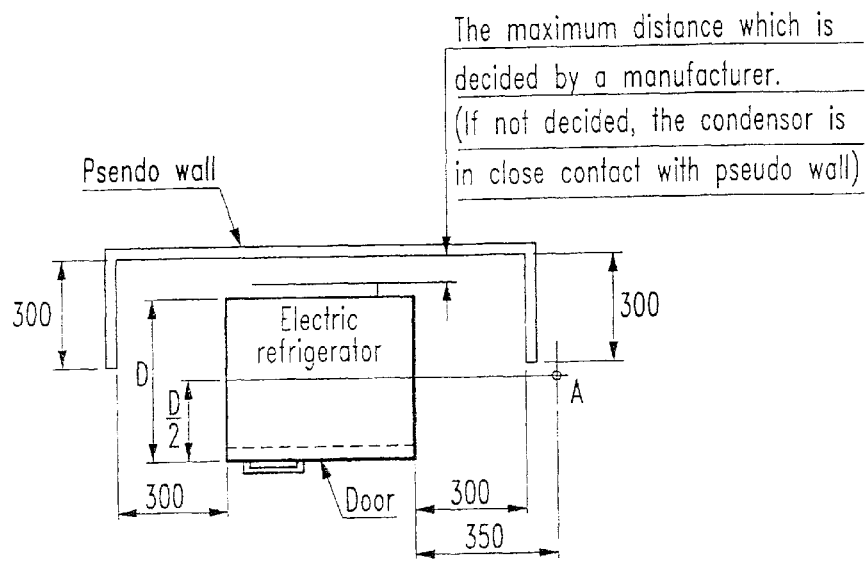
FIGS. 2A thru 2C depict conditions for installation of the refrigerator when measuring the amount of electric power consumption in the refrigerator.
Figure 2B:
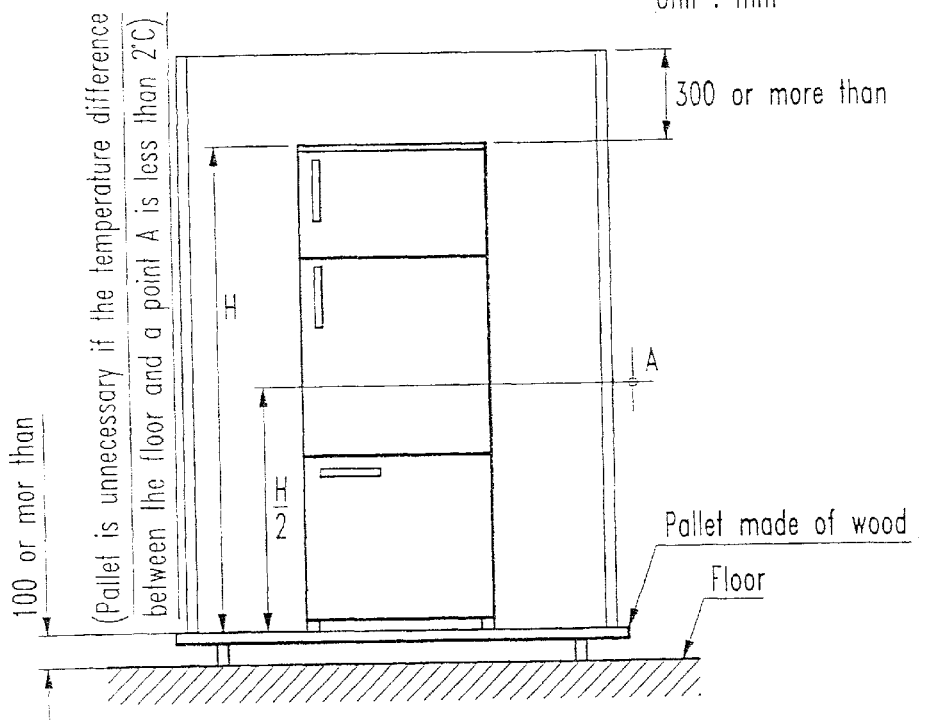
Figure 2C:
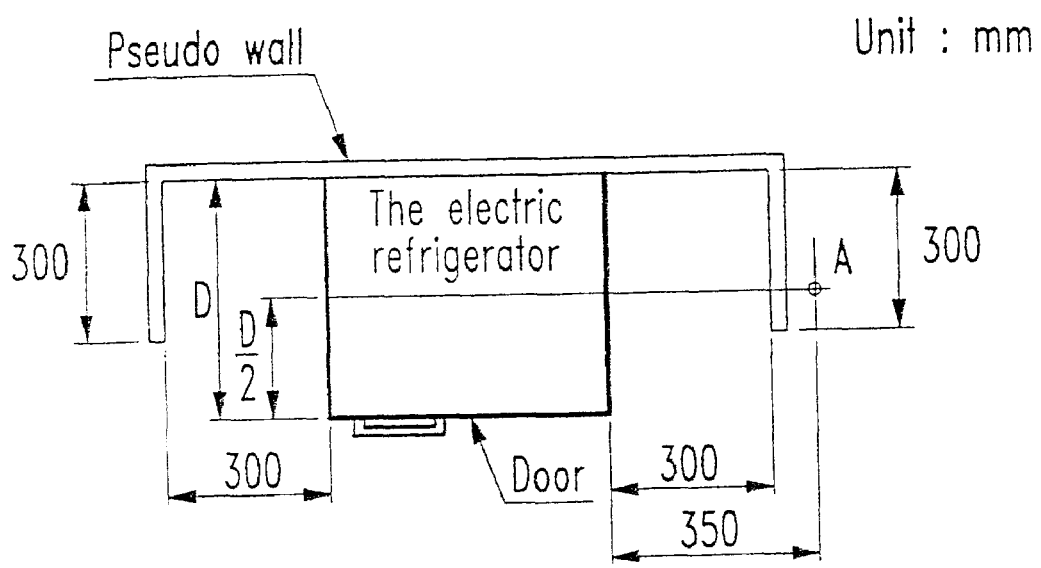

The refrigerator 10 to be tested is installed in a chamber which satisfies various conditions for the test as required by a particular country. The conditions are shown in more detail FIGS. 2A–2C. The conditions for installing the refrigerator in the chamber, as shown, are in accordance with the Korean Standards, for example, KSC9305. More specifically, FIG. 2A is a plan view of the arrangement for a refrigerator having an exposed condenser; FIG. 2B is a front view of the same arrangement; and FIG. 2C is a plan view of the arrangement for a refrigerator having a back wall in close contact with a pseudo wall.

The refrigerator 10 installed in the chamber, as described above, is measured by a measuring device 20 to obtain the amount of electric power consumption. The measuring device 20 also satisfies the industrial standards provided by the particular country or any other country.

A person who performs the test collects and organizes data relating to the amount of electric power consumption measured by the measuring device 20 with respect to the refrigerator (see block 22 of FIG. 1), and then draws up a report of the test (see block 24 of FIG. 1). The report is prepared with a word processor (computer 30) and printed by means of an output apparatus such as a printer 40, to output test results regarding the amount of electric power consumption in the refrigerator. Then, a determination is made as to whether the test results satisfy the regulations under the industrial standards of the countries. Once approved (block 60), a manufacturer inspects the test results and the report, and finally determines a specification for the refrigerator (block 70).

In this method for measuring the amount of electric power consumption in the refrigerator, there are disadvantages, as follows. Since the measuring device calculates and sums up the respective amount of electric power consumption for 24 hours, 48 hours or 78 hours according to the numbers of defrost operations, and then converts the sum of the amounts of electric power consumption to an average amount per month, much time is required for measuring the amount of electric power consumption. Also, electric power needed for the test is spent in proportional to the times for measuring the amount of electric power consumption.

Furthermore, since the data for the test carried out by the measuring device are organized by a person who manages the test, it is difficult to have an accurate, broad and excellent analysis of the data associated with the amount of electric power consumption in the refrigerator.

The present invention is implemented by insuring that an amount of electric power consumption and an operating time per operating cycle are almost constant during operating cycles of a refrigerator, except when a compressor operates twice after a defrosting operation is carried out.

Figure 3A:
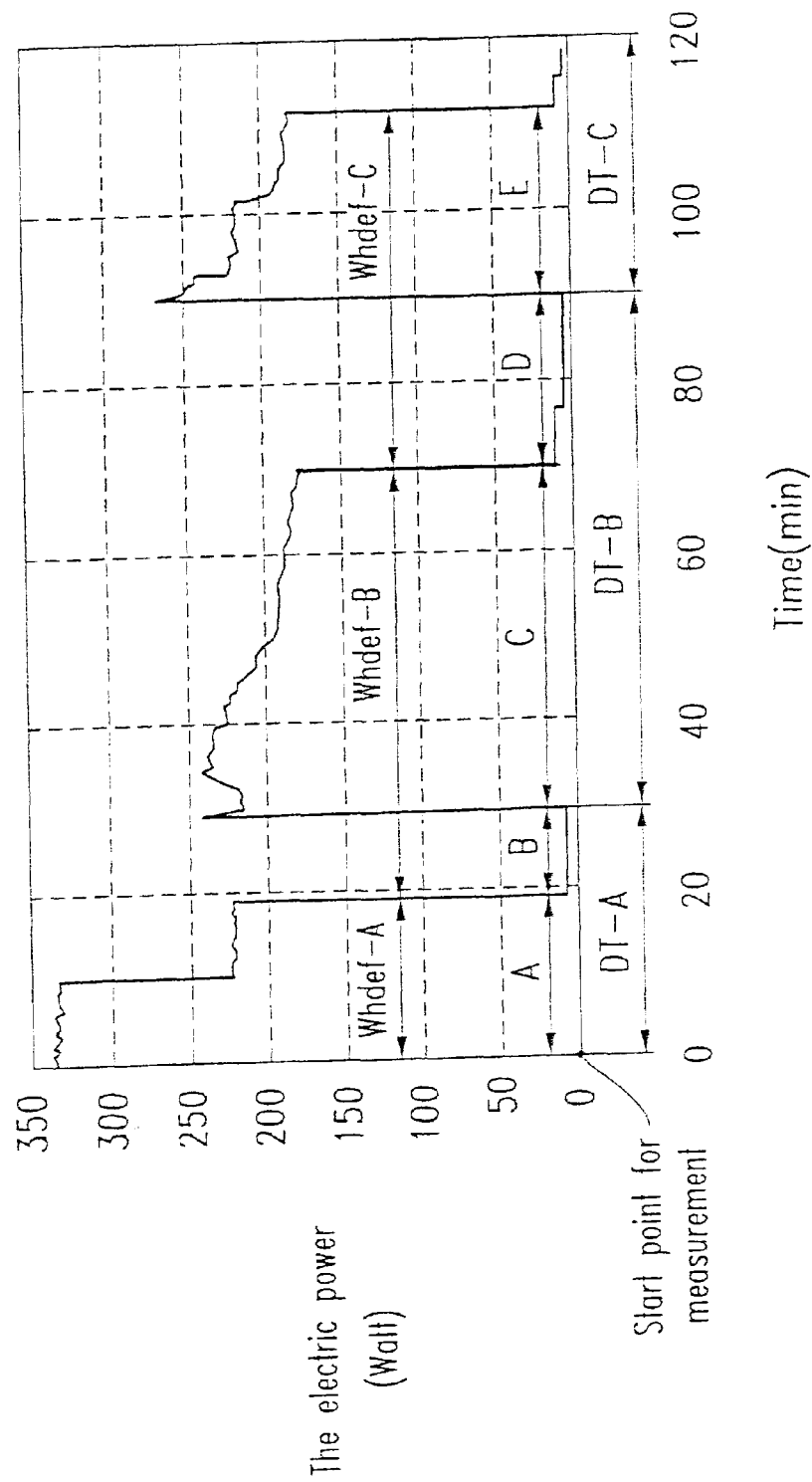
FIGS. 3A and 3B are graphs which are used for illustrating a principle of measuring an amount of electric power consumption according to the method of the present invention.

FIG. 3A is a graph showing the amount of electric power consumption in the refrigerator during two operating cycles of the compressor after the defrost operation. In FIG. 3A, Whdef-A shows an amount of electric power consumption when a current is applied to a defrosting heater (not shown) to eliminate frost in the refrigerator (a substantially enforced defrosting is carried out). Whdef-B and Whdef-C show amounts of the electric power consumption when the compressor (not shown) operates twice after the enforced defrosting by applying current to the defrosting heater.

Figure 3B:
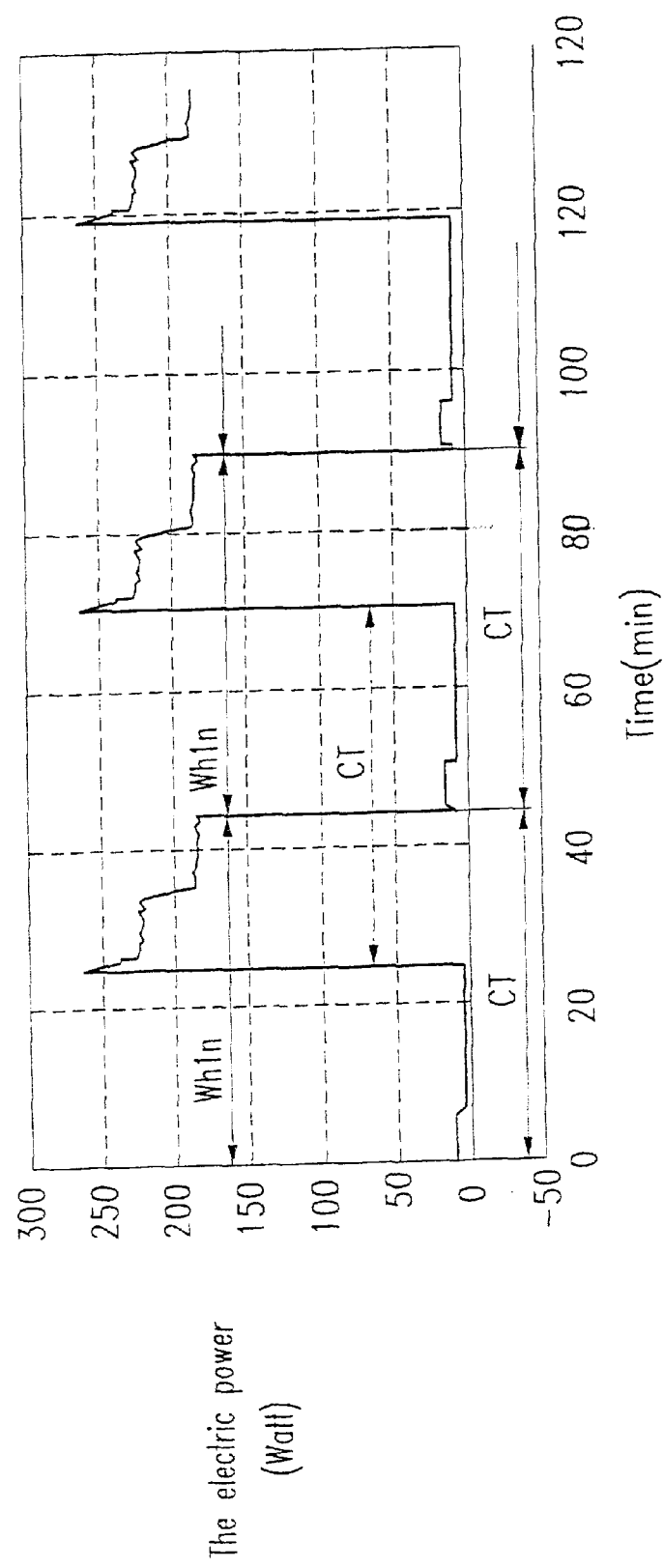

FIG. 3B is a graph showing an amount of electric power consumption Whln when the refrigerator carries out refrigerating cycles after the enforced defrosting operation is carried out and the compressor operates twice.

The graphs shown in FIGS. 3A and 3B are shown on the basis of a test for measuring the amount of electric power consumption.

With respect to FIGS. 3A and 3B, Whdef-A, Whdef-B and Whdef-C, showing respective amounts of electric power consumption, are different from each other in view of the amount of electric power consumption, but Whln showing the amount of electric power consumption is always constant regardless of the number of operation cycles. Furthemore, Whdef-A, Whdef-B, and Whdef-C, showing respective amounts of electric power consumption, are obtained within respective times, DT-A, DT-B and DT-C, but Whln showing the amount of electric power consumption is constantly obtained within a determinate time CT regardless of the number of operating cycles. Accordingly, when the process is employed to measure the amount of electric power consumption Whdef-A when carrying out an enforced defrosting operation, to measure the amount of electric power consumption Whdef-B and Whdef-C when the compressor performs the operating cycle twice after carrying out the enforced defrosting operation, to measure the amount of electric power consumption Whln when the refrigerator performs refrigerating cycles after the compressor performs the operating cycles twice, and to measure the times DT-A, DT-B, DT-C and CT corresponding to the amounts of electric power consumption Whdef-A, Whdef-B, Whdef-C and Whln, respectively, the test need not be carried out for 24 hours, 48 hours and 78 hours to measure the amount of electric power consumption as described above.

The total amount of electric power consumption Wh in the refrigerator can be calculated by using the respective amount of electric power consumption (Whdef-A, Whdef-B, Whdef-C, and Whln) and the times DT-A, DT-B, DT-C, and CT described above, as follows:

$$Wh = Whdef \times k + Whln \times \left( \frac{24 \times n - DT \times k}{CT} \right)$$

where n=1, 2, or 3, k=1 or 2, and Wh represents the total amount of electric power consumption of the refrigerator. Whdef is the amount of electric power consumption when electric current is applied to the defrosting heater and the compressor performs operating cycles twice after starting the measurement according to the defrosting operation under the regulations of the industrial standards as described above. Whdef shows a total sum of Whdef-A, Whdef-B and Whdef-C. In addition, DT represents a defrosting cycle time, which is the summed total time of DT-A, DT-B and DT-C, respectively, corresponding to Whdef-A, Whdef-B and Whdef-C, respectively.

DT=(time for applying electric current to the defrosting heater A)+(a first pause time B)+(a first compressor operating time C)+(a second pause time D)+(a second compressor operating time E). Accordingly, if the total time needed for the measurement is TCT, then TCT=(DT×2)+(CT×the number of refrigerating cycles at intervals of defrosting periods.

In the above formula, n represents an integral number, which is a predetermined term provided under the industrial standards. The term k represents an integral number, which is a determinate number of the defrosting operation provided under the industrial standards. If TCT<1440, n is 1 while k is 2. If 1440<TCT<2880, n is 2 while k is 2. Furthermore, if TCT≧2880, n is 3 while k is 1 or 2. At this point, k=1 means that the number of the defrosting operation is 1 for 4320 minutes, and k=2 means that the number of the defrosting operations is 2 for 4320 minutes. The number 1440 represents the number of minutes in 24 hours. The number 2880 represents the number of minutes in 48 hours. The number 4320 represents the number of minutes in 72 hours.

When the amount of electric power consumption Wh in the refrigerator is calculated by using the above formula, the amount of electric power consumption KWhm for a month can be calculated as follows:

$$KWhm = \frac{WH}{n} \times \frac{365}{12 \times 1000}$$

where the number 365 shows days and the number 12 shows months.

According to the method of the present invention as described above, when measuring the operating time of the defrosting heater DT-A during the enforced defrosting, the first operating time of the compressor DT-B after operating the defrosting heater, the second operating time of the compressor DT-C after operating the defrosting heater, and an average time for operating the refrigerating operation of the refrigerator CT, it is possible to substantially reduce the that time for measurement of the amount of electric power consumption in the refrigerator.

Furthermore, when the time for the test to measure the amount of electric power consumption is substantially reduced, it is possible to reduce the amount of electric power to be used for the test in proportion to the reduced time.

According to the method of the present invention, when measuring the amount of electric power consumption in the refrigerator, it takes 6 hours to measure the amount of electric power consumption. That is, the time needed for the test to measure the amount of electric power consumption according to the method of the present invention can be substantially reduced over the time needed for the test according to prior methods. Furthermore, according to the method of the present invention, errors in the amount of electric power consumption in the refrigerator are about 1% which satisfies the allowable error (for example, about 15%) provided under industrial standards.

The system for measuring the amount of electric power consumption in the refrigerator will be described in detail, such system being applied to tests according to the present invention and the prior art. In the figures below, like reference numerals are used to identify like elements in the previous figures.

Figure 4:
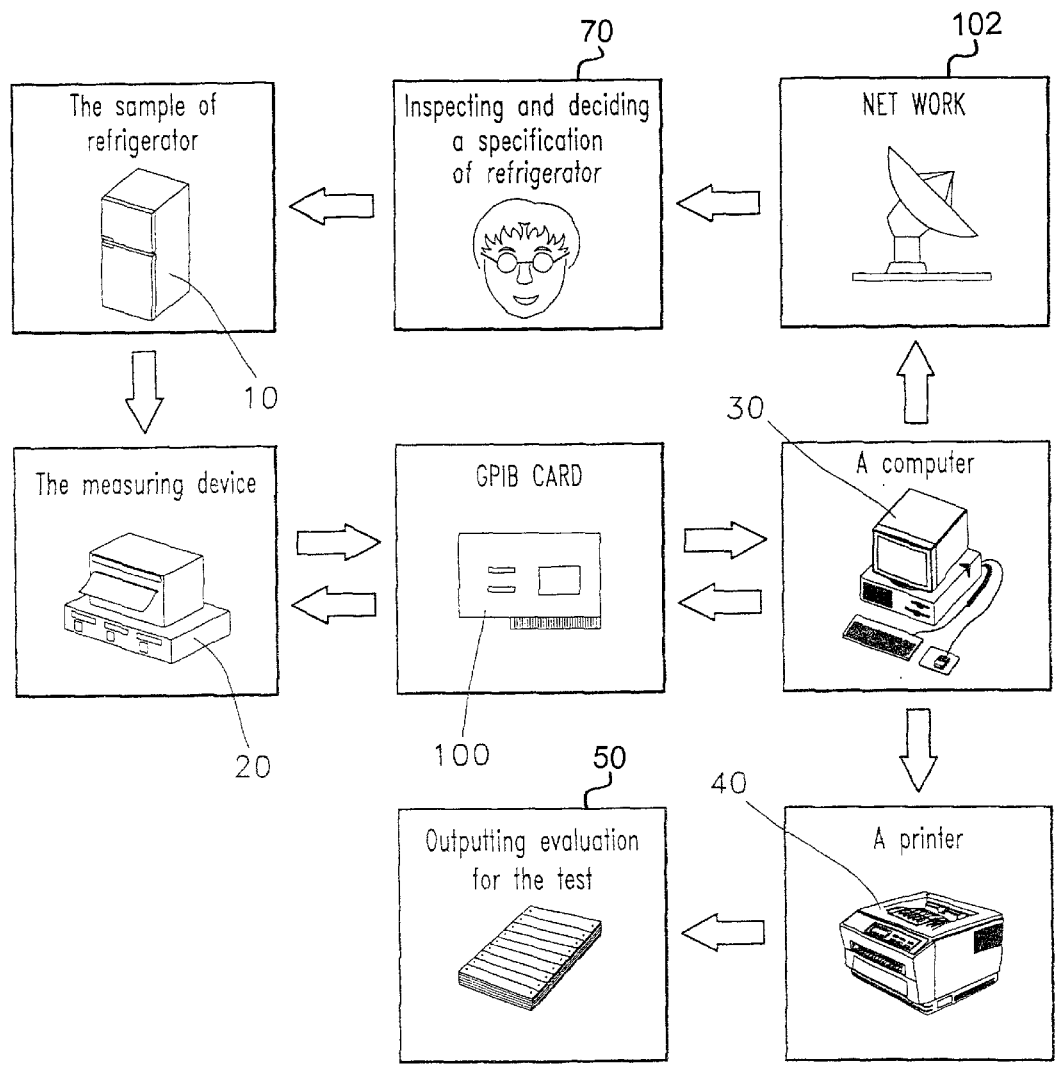
FIG. 4 is a block diagram showing a system for measuring the amount of electric power consumption according to the present invention.

FIG. 4 is a block diagram showing the system for measuring the amount of electric power consumption according to the present invention.

Referring to FIG. 4, in the system according to the present invention, the measuring device 20 transmits to the computer 30 data regarding the amount of electric power consumption in the refrigerator 10 in the form of electric signals. The GP-IB card 100 serves as an interfacing device and controls the measuring device 20 according to control signals from the computer 30. The computer 30 transmits and receives the report, including an evaluation of the test through a communication network 102 to and from a decider 70.

In FIG. 4, it will be understood by those skilled in the art that the GP-IB card 100 is, preferably, contained in the measuring device 20 or the computer 30. The computer 30 sets the conditions of the test for the refrigerator 10, satisfying the method of the present invention, through the GP-IB card 100 which electrically connects the computer 30 with the measuring device 20. The computer 30 displays on a monitor (not shown) the data for the test of measurement of the amount of electric power consumption, which are obtained by the measuring device 20.

Furthermore, in the system for measuring the amount of electric power consumption according to the present invention, as shown in FIG. 4, the data for the test of measurement of the amount of electric power consumption, which are obtained by the measuring device 20, are put in order not by a person but by computer 30. The data processed by the computer 30 are transmitted through the communication network 102 to a person 10 who needs the data.

Accordingly, the system for measuring the amount of electric power consumption accomplishes the accurate, broad and excellent analysis for the data regarding the test for measuring the amount of electric power consumption.

As described above, the method and system for measuring the amount of electric power consumption in the refrigerator according to the present invention can reduce the time and electric power consumption required for measuring the amount of electric power consumption, and achieves an accurate, broad and excellent analysis for the data regarding the test of measurement of the amount of electric power consumption in the refrigerator.

The advantages which are provided by the system and method for measuring the amount of electric power consumption according to the present invention will be described in detail below.

There are advantages in that the system and method according to the present invention satisfy the regulations under the industrial standards of the various countries and can reduce the time needed for the test of measurement of the amount of electric power consumption (for example, to the extent of 6 hours).

Furthermore, there is another advantage in that the system and method according to the present invention accomplish accurate, broad and excellent analysis of the data obtained by the test of measurement of the amount of electric power consumption, and enable the person carrying out the test to prepare the report for the test immediately and to inform designers of the results of the test.

There is still another advantage in that the cost of the test can be decreased by reducing the time for use of the laboratory and samples of the refrigerator.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A method for measuring an amount of electric power consumption of a refrigerator, comprising the steps of:

measuring the amount of electric power consumption and a time of a defrosting cycle in a refrigerator during an operation of a defrosting heater after starting a measurement of the amount of electric power consumption and during two cycles of operating a compressor after operating the defrosting heater;

measuring an average of electric power consumption per a cycle and an average of operating time per a cycle in the refrigerator during an operation of refrigerating cycles after the defrosting cycle; and calculating a total amount of the electric power consumption of the refrigerator as follows:

$$Wh = Whdef \times k + Wh\ln \times \left(\frac{24 \times n - DT \times k}{CT}\right)$$

where n=1, 2, or 3, k=1 or 2, Wh represents the total amount of the electric power consumption of the refrigerator, Whdef is the amount of electric power consumption during the defrosting cycle, DT represents a defrosting cycle time, CT is the average operation time per cycle, and Whln is the average amount of electric power consumption per refrigerating cycle.

2. The method as claimed in claim 1, wherein the time of the defrosting cycle is a sum of a time for applying an electric current to the defrosting heater, a first off time, a first operation time of the compressor, a second off time, and a second operation time of the compressor.

3. The method as claimed in claim 1, wherein when an operation time for a measurement test is shown as follows:

$TCT=DT\times 22+CT\times$(the number of operation cycles for defrosting period)

if TCT<1440, n is an integral number equal to 1,
if 1440≦TCT≦2880, n is an integral number equal to 2, and
if 2880≦TCT, n is an integral number equal to 3.

4. The method as claimed in claim 1, wherein when an operation time for a measurement test is shown as follows:

$TCT=DT\times 22+CT\times$(the number of operation cycles for defrosting period)

if TCT<1440, k is an integral number equal to 1,
if 1440≦TCT≦2880, k is an integral number equal to 2, and
if 2880≦TCT≦4320 and the number of the defrosting cycles is 1, k is an integral number equal to 1, and when the number of the defrosting cycles is 2, k is an integral number equal to 2.

5. The method as claimed in claim 4, wherein time is measured in minutes.

6. The method as claimed in claim 4, wherein the amount of electric power consumption in the refrigerator per month is calculated as follows:

$$KWhm = \frac{Wh}{n} \times \frac{365}{12 \times 1000}.$$

7. The method as claimed in claim 3, wherein the amount of electric power consumption in the refrigerator per month is calculated as follows:

$$KWhm = \frac{Wh}{n} \times \frac{365}{12 \times 1000}.$$

8. The method as claimed in claim 2, wherein the amount of electric power consumption in the refrigerator per month is calculated as follows:

$$KWhm = \frac{Wh}{n} \times \frac{365}{12 \times 1000}.$$

9. The method as claimed in claim 1, wherein the amount of electric power consumption in the refrigerator per month is calculated as follows:

$$KWhm = \frac{Wh}{n} \times \frac{365}{12 \times 1000}.$$

10. The method as claimed in claim 1, wherein time is measured in minutes.

11. A system for measuring an amount of electric power consumption in a refrigerator according to a test condition and method specified by an industrial standard, comprising:

a device for measuring the amount of electric power consumption for a defrosting cycle, a time for performing the defrosting cycle, an average amount of the electric power consumption for a refrigerating cycle, and an average time for performing the refrigerating cycle;

a computer for processing data measured by the measuring device, for outputting a report and evaluation for a measuring test, and for transmitting the data on-line; and an interfacing device for transmitting the data which are measured by the measuring device as electric signals to the computer, and for receiving electric signals from the computer to control the measuring device.

12. The system as claimed in claim 11, wherein the interfacing device comprises a GP-IB card.

13. The system as claimed in claim 11, wherein said computer calculates a total amount of the electric power consumption of the refrigerator as follows:

$$Wh = Whdef \times k + Wh\ln \times \left(\frac{24 \times n - DT \times k}{CT}\right)$$

where n=1, 2, or 3, k=1 or 2, Wh represents the total amount of the electric power consumption of the refrigerator, Whdef is the amount of electric power consumption during the defrosting cycle, DT represents a defrosting cycle time, CT is the average operation time per cycle, and Whln is the average amount of electric power consumption per refrigerating cycle.

14. The system as claimed in claim 11, wherein the refrigerator includes a defrosting heater, and wherein the time of the defrosting cycle is a sum of a time for applying an electric current to the defrosting heater, a first off time, a first operation time of the compressor, a second off time, and a second operation time of the compressor.

15. The system as claimed in claim 13, wherein when an operation time for a measurement test is shown as follows:

$TCT=DT\times 22+CT\times$(the number of operation cycles for defrosting period)

if TCT<1440, n is an integral number equal to 1,
if 1440≦TCT≦2880, n is an integral number equal to 2, and
if 2880≦TCT, n is an integral number equal to 3.

16. The system as claimed in claim 13, wherein when an operation time for a measurement test is shown as follows:

$TCT=DT\times 22+CT\times$(the number of operation cycles for defrosting period)

if TCT<1440, k is an integral number equal to 1,
if 1440≦TCT≦2880, k is an integral number equal to 2, and if 2880≦TCT≦4320 and the number of the defrosting cycles is 1, k is an integral number equal to 1, and when number of the defrosting cycles is 2, k is an integral number equal to 2.

17. The system as claimed in claim 11, wherein the amount of electric power consumption in the refrigerator per month is calculated as follows:

$$KWhm = \frac{Wh}{n} \times \frac{365}{12 \times 1000}$$

where n=1, 2 or 3, and Wh represents the total amount of the electric power consumption of the refrigerator.

* * * * *